United States Patent
Tokoi et al.

(10) Patent No.: US 10,763,716 B2
(45) Date of Patent: Sep. 1, 2020

(54) AXIAL-AIR-GAP DYNAMO-ELECTRIC MACHINE WITH A TUBULAR-SHAPED STATOR BOBBIN

(71) Applicant: Hitachi Industrial Equipment Systems Co., Ltd., Chiyoda-ku, Tokyo (JP)

(72) Inventors: Hirooki Tokoi, Tokyo (JP); Daisuke Kitajima, Tokyo (JP); Tomonori Kawagoe, Tokyo (JP); Katsuyuki Yamazaki, Tokyo (JP); Toru Sakai, Tokyo (JP); Shuuichi Takahashi, Tokyo (JP); Toshifumi Suzuki, Tokyo (JP); Norihisa Iwasaki, Tokyo (JP); Ryousou Masaki, Tokyo (JP); Yuji Enomoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 673 days.

(21) Appl. No.: 15/303,801

(22) PCT Filed: Apr. 14, 2014

(86) PCT No.: PCT/JP2014/060563
§ 371 (c)(1),
(2) Date: Dec. 14, 2016

(87) PCT Pub. No.: WO2015/159329
PCT Pub. Date: Oct. 22, 2015

(65) Prior Publication Data
US 2017/0093244 A1 Mar. 30, 2017

(51) Int. Cl.
*H02K 3/34* (2006.01)
*H02K 21/24* (2006.01)
(Continued)

(52) U.S. Cl.
CPC ............... *H02K 3/345* (2013.01); *H02K 1/14* (2013.01); *H02K 1/182* (2013.01); *H02K 3/18* (2013.01);
(Continued)

(58) Field of Classification Search
CPC .......... H02K 3/345; H02K 3/18; H02K 3/524; H02K 11/40; H02K 11/01; H02K 1/14;
(Continued)

(56) References Cited

U.S. PATENT DOCUMENTS

2004/0000830 A1   1/2004   Gomyo et al.
2004/0164641 A1   8/2004   Yamada et al.
(Continued)

FOREIGN PATENT DOCUMENTS

EP   1 684 399 A2   7/2006
JP   2003-324886 A   11/2003
(Continued)

OTHER PUBLICATIONS

International Search Report (PCT/ISA/210) issued in PCT Application No. PCT/JP2014/060563 dated Jul. 22, 2014 with English translation (4 pages).
(Continued)

*Primary Examiner* — Jue Zhang
(74) *Attorney, Agent, or Firm* — Crowell & Moring LLP

(57) ABSTRACT

An axial-air-gap rotating electric machine with a stator bobbin is provided. The bobbin renders the respective turn counts of windings in the machine the same and minimizes the lengths of connecting wires between continuous windings regardless of the continuous turn count, the direction in which each winding is wound, and whether the number of stages is odd or even. The bobbin, which has a tubular shape that substantially matches the exterior shape of a core, is provided with flanges that extend outwards from near the
(Continued)

respective openings in the bobbin. One of the flanges has two first notches, and the other flange has a second notch. The axial positions of the starting and finishing ends of coils on adjacent stator cores are the same, and the flanges containing the notches through which the ends of the coils are run are on the same side with respect to the openings.

20 Claims, 11 Drawing Sheets

(51) Int. Cl.
| | |
|---|---|
| *H02K 3/18* | (2006.01) |
| *H02K 11/40* | (2016.01) |
| *H02K 9/22* | (2006.01) |
| *H02K 3/52* | (2006.01) |
| *H02K 15/04* | (2006.01) |
| *H02K 1/18* | (2006.01) |
| *H02K 1/14* | (2006.01) |
| *H02K 11/01* | (2016.01) |

(52) U.S. Cl.
CPC ............... *H02K 3/524* (2013.01); *H02K 9/22* (2013.01); *H02K 11/40* (2016.01); *H02K 15/045* (2013.01); *H02K 21/24* (2013.01); *H02K 11/01* (2016.01)

(58) Field of Classification Search
CPC ........ H02K 1/182; H02K 9/22; H02K 15/045; H02K 21/24
See application file for complete search history.

(56) References Cited

U.S. PATENT DOCUMENTS

| | | | |
|---|---|---|---|
| 2006/0163964 A1 | 7/2006 | Kojima et al. | |
| 2007/0001540 A1 | 1/2007 | Matsuzaki et al. | |
| 2008/0106161 A1* | 5/2008 | Matsuzaki | H02K 3/524 310/71 |
| 2010/0148611 A1* | 6/2010 | Wang | H02K 21/24 310/156.37 |
| 2014/0009009 A1* | 1/2014 | Deguchi | H02K 9/22 310/43 |
| 2015/0303745 A1* | 10/2015 | Matsumoto | H02K 1/182 310/43 |
| 2018/0331603 A1* | 11/2018 | Jahshan | H02K 35/02 |

FOREIGN PATENT DOCUMENTS

| | | |
|---|---|---|
| JP | 2006-230179 A | 8/2006 |
| JP | 2007-14146 A | 1/2007 |
| JP | 2008-118833 A | 5/2008 |
| JP | 2008-125278 A | 5/2008 |
| JP | 2010-88142 A | 4/2010 |
| JP | 2010-183727 A | 8/2010 |
| JP | 2011-78294 A | 4/2011 |
| JP | 2011-115008 A | 6/2011 |
| JP | 2011-172445 A | 9/2011 |
| JP | 2013-118750 A | 6/2013 |
| WO | WO 2013/080720 A1 | 6/2013 |

OTHER PUBLICATIONS

Chinese-language Office Action issued in counterpart Taiwan Application No. 104103620 dated Jan. 26, 2016 with English translation (8 pages).

Japanese-language Office Action issued in counterpart Japanese Application No. 2016-513501 dated Jul. 18, 2017 with English translation (8 pages).

Extended European Search Report issued in counterpart European Application No. 14889733.3 dated Oct. 23, 2017 (8 pages).

* cited by examiner

AXIAL-AIR-GAP DYNAMO-ELECTRIC MACHINE WITH A TUBULAR-SHAPED STATOR BOBBIN

TECHNICAL FIELD

The present invention relates to an axial-air-gap rotating electric machine, and more particularly to an axial-air-gap rotating electric machine provided with a stator bobbin (insulator).

BACKGROUND ART

An axial-air-gap rotating electric machine has been attracting attention because it has a configuration effective for size reduction and efficiency improvement of a thin rotating electric machine. The rotating electric machine has a structure in which a tubular stator and a disk-shaped rotor are arranged so that the faces of the stator and the rotor face each other via a predetermined air gap in the rotation axis radial direction. Also, a member (core member) is known which is configured by a plurality of cores arranged in the circumferential direction, a coil wound around each of the cores, and a bobbin (insulator) which insulates between the cores and the coil.

Here, the bobbin is formed by a tubular section having the coil wound therearound, and a flange located at each of both ends of the tubular section and protruding on the outer peripheral side. There are various techniques about the shape of the bobbin, because the shape of the bobbin greatly influences the characteristics and workability of the rotating electric machine.

For example, Patent Literature 1 discloses an axial-air-gap motor having core members in each of which an insulator flange (flange) is provided with a notch groove for leading out the coil so that the coil is lead out from the notch groove to the periphery of the flange.

Further, for example, Patent Literature 2 discloses an axial-air-gap motor in which insulators, each having a core mounted thereto, are arranged in series so that a coil is wound continuously around the insulators. The insulator of Patent Literature 2 is configured such that, in order to prevent that the coil is damaged by the edge of the core when, during the winding, the coil is extended over the core to the adjoining insulator, a thin plate-like rib is provided at the end surface of the outer peripheral surface of the core so that the edge and the coil are prevented from being brought into direct contact with each other.

CITATION LIST

Patent Literature

PATENT LITERATURE 1: JP-A-2008-118833
PATENT LITERATURE 2: JP-A-2007-14146

SUMMARY OF INVENTION

Technical Problem

Meanwhile, in a rotating electric machine, there is a case where coils, each having a different wire diameter and a different number of turns, are arranged in the same coil arrangement spaces. In this case, the winding start position and the winding end position in the winding coil of even number stages are opposite to the winding start position and the winding end position in the winding coil of odd number stages in the winding axis. Further, when the same phase coils are arranged in series to be continuously wound, the distance between the continuous coils and the winding direction between the continuous coils are different according to the slot combination.

In Patent Literature 1, a lead-out line section is provided at only one of the flanges (flange-shaped protruding portions) respectively provided at both ends of the insulator (bobbin). Therefore, when the winding end of a specific core member is located on the side opposite to the side of the lead-out line section, it is necessary that the coil be extended over the outer periphery of the adjacent core member coil and transferred to the lead-out line section. In this configuration, the cost loss and productivity are significantly affected by the extra crossover wire.

It should be noted that, in Patent Literature 2, there is no disclosure about the lead-out line section of the coil which is lead out from each of the core members in the case where the core members are annularly arranged.

There is desired a bobbin which can flexibly cope with the change in the winding specification, and can contribute to productivity improvement, cost reduction, and performance improvement.

Solution to Problem

In order to solve the above-described problems, for example, the invention described in the claims is applied. That is, the invention provides an axial-air-gap rotating electric machine including: a stator configured by annularly arranging, about the rotation axis of the machine, a plurality of stator cores each including a core having an approximately columnar shape having end surfaces and an outer peripheral surface, a coil wound on the outer peripheral surface of the core, and a bobbin arranged between the core and the coil; and at least one rotor, a surface of which faces the end surface on each of the rotation axis radial directions via a predetermined air gap. The axial-air-gap rotating electric machine is characterized in that the bobbin is formed in a tubular shape having an inner peripheral shape approximately coincident with the outer peripheral shape of the core, and has a flange extended by a predetermined length to the outer peripheral side from the vicinity of each of both openings of the bobbin, in that one of the two flanges has two first notches, in that the other of the two flanges has at least a second notch, and in that the axial direction positions of the winding start and the winding end of the coil are the same between the stator cores adjacent to each other, and the flanges, each having the notch through which the coil is led out, are located on the same opening side.

Advantageous Effects of Invention

The present invention provides the effect that, by using the same bobbin, it is possible that the number of turns of each of windings is the same, and the length of the crossover wire between the continuously wound wires is minimized, and the shortening of the manufacture period and the reduction of the manufacturing cost can be achieved without deteriorating the characteristics of the rotating electric machine and without regard to the winding specification change.

Other objects and advantages of the invention will become apparent from the following description.

DESCRIPTION OF EMBODIMENTS

In the following, embodiments according to the present invention will be described with reference to the accompanying drawings.

First Embodiment

Figure 1:
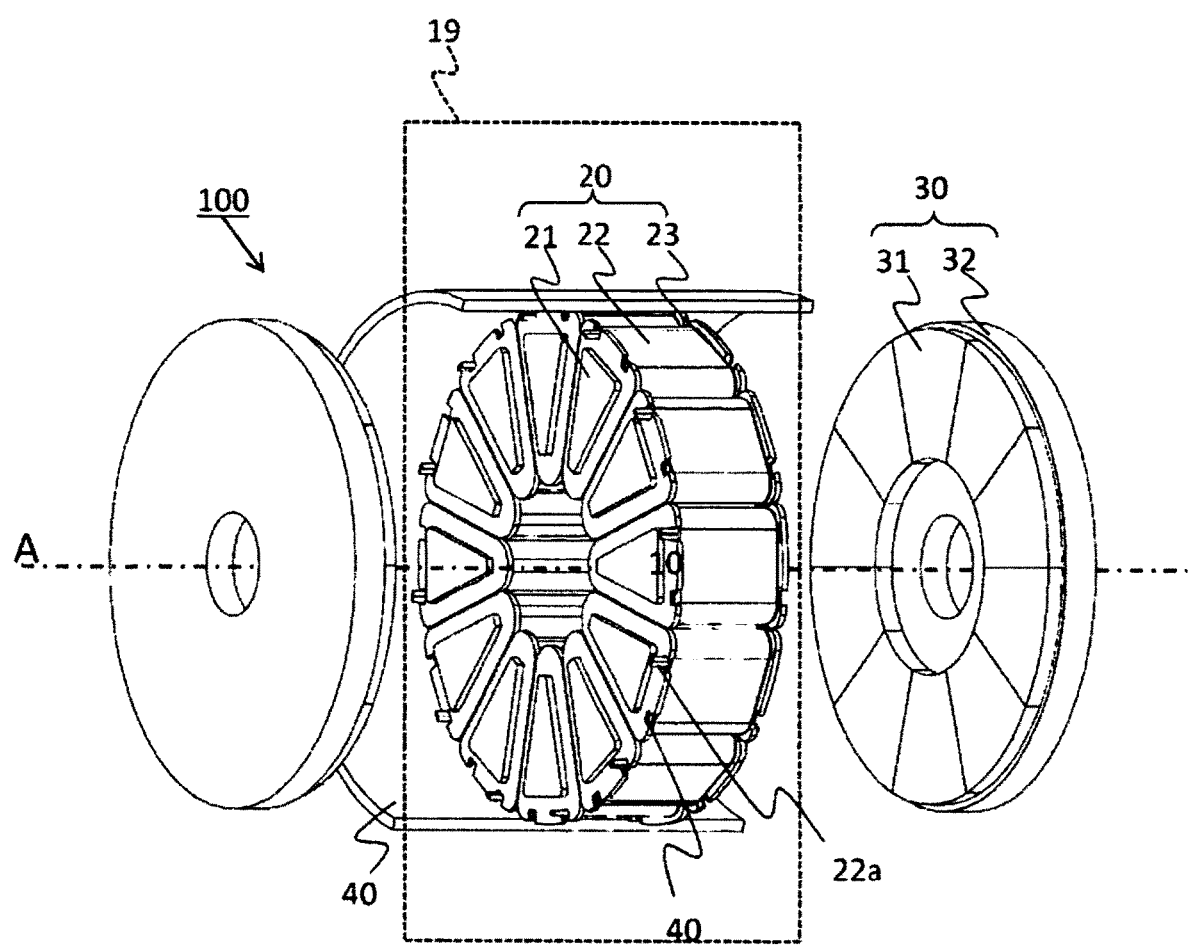
FIG. 1 is a perspective view showing a configuration of a main part of an armature of an axial-air-gap motor according to a first embodiment to which the present invention is applied.

FIG. 1 shows a main configuration of an armature portion of a double-rotor type axial-air-gap permanent magnet synchronous motor 1 (hereinafter simply referred to as "motor 1") to which the present invention is applied.

The motor 1 has a configuration in which a stator 19 having a plurality of stator cores 20 arranged annularly about a rotation axis, and two rotors 30 respectively having surfaces, which respectively face both axial-direction end surfaces of the stator 19, are arranged via a predetermined air gap to be aligned in the rotation axis radial direction. The stator 19 is fixed to the inner peripheral surface of a housing 40 having a tubular-shaped inner tube. End brackets are connected respectively on both opening sides of the housing 40 to rotatably support a shaft (not shown) fixed to the rotor 30 via bearings (not shown).

The stator core 20 is configured by at least a laminated core 21 having end surfaces of approximately trapezoidal shape or fan-shape, a bobbin 23 having an inner tubular shape approximately the same as the core 21, and a coil 22 wound on the outer tubular portion of the bobbin 23. The core 21 is obtained by laminating, in the axial diameter direction, thin plate-like members, each of which includes a magnetic body (amorphous in the present embodiment) and is cut to have the width increasing toward the housing side in the axial diameter. The core 21 may be a dust core and a cast core.

It should be noted that, although not shown, the stator core 20 is molded integrally with the housing 40 by resin molding to be simultaneously fixed to the housing 40. It should be noted that the stator cores 20 may also be configured such that the stators 40 are mutually connected in an annular shape to be fixed to the housing by bolts, or the like, or such that only the stators 20 are formed integrally with each other by resin molding to be fixed to the housing 40 by bolts. In the case where only the stator cores 20 are resin-molded, it can be expected that the strength and durability are improved.

The rotor 30 is configured such that approximately fan-shaped permanent magnets 31 are arranged on a yoke 32 in the rotation direction so that the magnetic poles of the permanent magnets adjacent to each other are different from each other. It should be noted that, although a double-rotor type is exemplified in the present embodiment, the present invention is limited to this, and a single-rotor type, a triple-rotor type, or the like, may also be used. Further, a terminal box is provided at one of the side surfaces of the housing 40, and the primary side electric wire and the secondary side wire are electrically connected to each other via the terminal block. The crossover wire led out from the winding 22 is connected to the secondary side wire.

Figure 2:
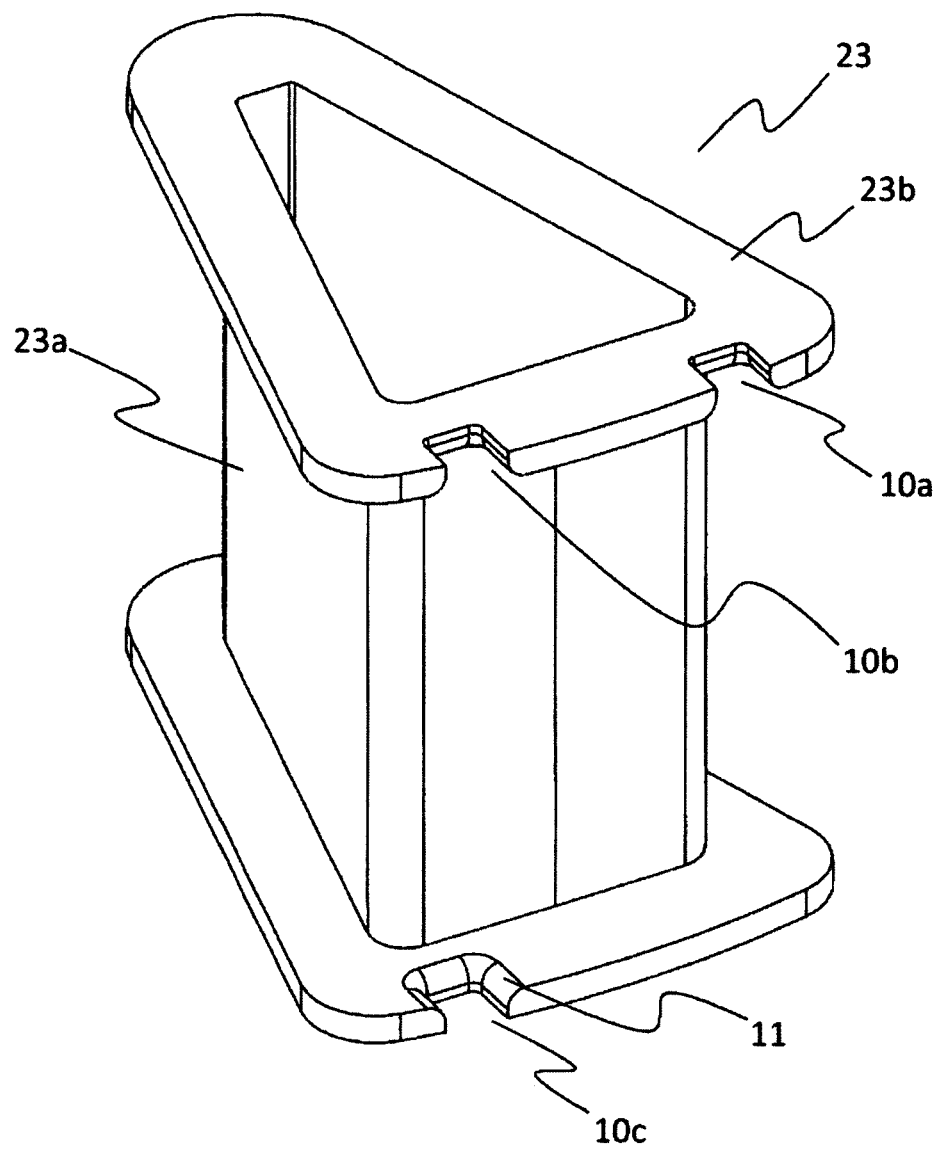
FIG. 2 is a perspective view showing individual characteristics of a bobbin according to the first embodiment.
Figure 3:
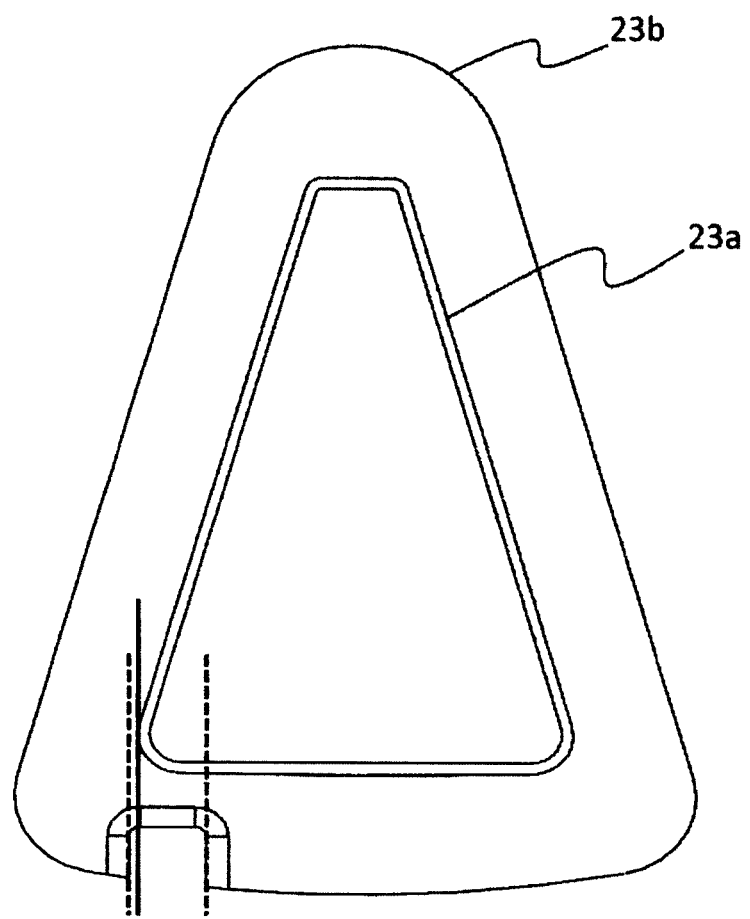
FIG. 3 is a view showing one end portion of the bobbin shown in FIG. 2.

FIG. 2 and FIG. 3 show a configuration of the bobbin 23. As shown in FIG. 2, the bobbin 23 has a tubular section 23a around which the coil 22 is wound, and a flange 23b located at each of the ends of the tubular section 23a and protruded by a predetermined width to the outer peripheral side. In FIG. 2, first notches 10a and 10b are provided at the outer diameter side of the upper flange (the side of the housing 40), and a second notch 10c is provided at the outer diameter side of the lower flange.

As shown by FIG. 10c, it is preferable that the edge (inner edge corner) of each of the notches be chamfered. In the present embodiment, each of the flanges is formed so that the inner edge corner becomes a curvature radius R11 which is large rather than the diameter of the coil. As shown in FIG. 3, each of the three notches is provided in the vicinity of the extension line from both ends of a bottom portion of the core 21 (approximately coincident with both ends of a bottom portion of the tubular section 23a) to the side of the housing 40. In other words, the extension line is on the line obtained by projecting the core 21 from the notch 10a, and the like. More preferably, the outer side of the inner edge of each of the notches 10a, 10b and 10c is located on each of the extension lines corresponding to the notches. This is because the coil 22 can be guided to a starting position without difficulty.

Figure 4A:
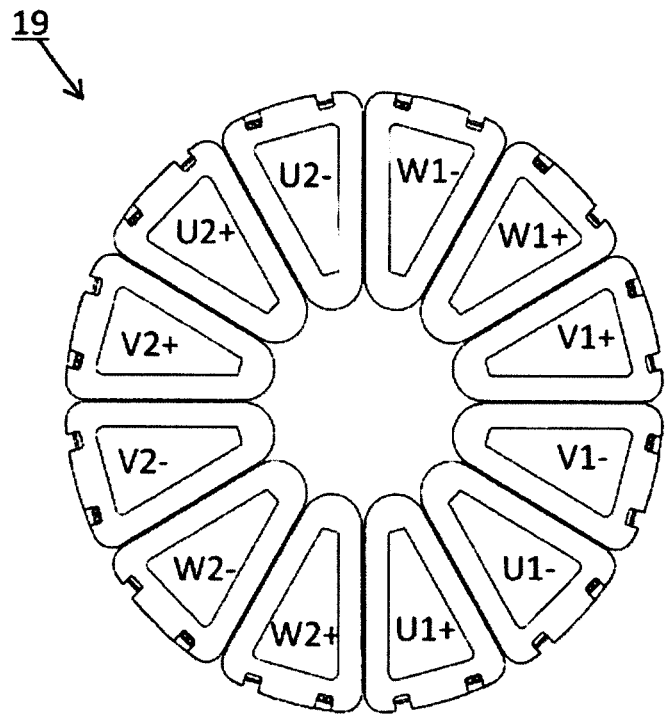
FIGS. 4A and 4B are schematic views each showing a connection state of a 10-pole 12-slot motor according to the first embodiment.
Figure 4B:
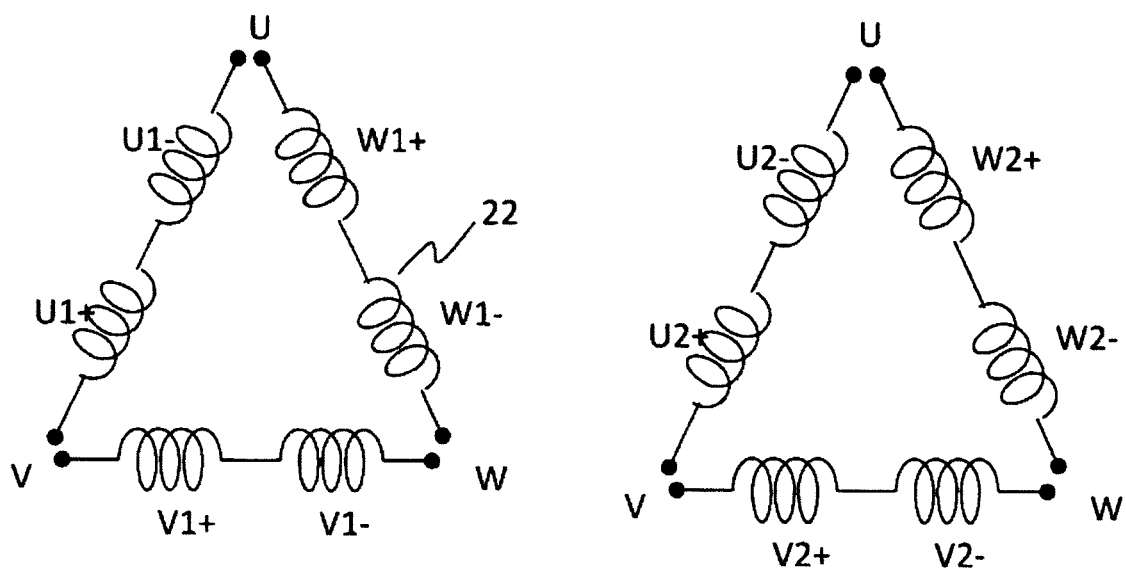

FIG. 4(a) and FIG. 4(b) schematically show a configuration of the coils of the motor 1. Here, the description is given by taking as an example a 10-pole 12-slot 3-phase configuration.

It is assumed that the coils 22 are connected as the delta connection having the two series and two parallel connection, and continuous windings of the same phase are connected in series. It should be noted that, as the winding method, there are two methods of an odd number of stages and of an even number of stages. Here, the plus and minus in each of the figures represent the winding directions of the coil. As shown in FIG. 4(b), in the 10-pole 12-slot motor, windings of the same phase, which have different winding directions, are arranged adjacent to each other. Further, as shown in FIG. 4(b), a delta connection, which is configured by connecting the six coils of U1+ to W1− so that the windings of the same phase are connected in series, is connected in parallel with a delta connection, which is configured by connecting the six coils of U2− to W2+ so that the windings of the same phase are connected in parallel.

Figure 5A:
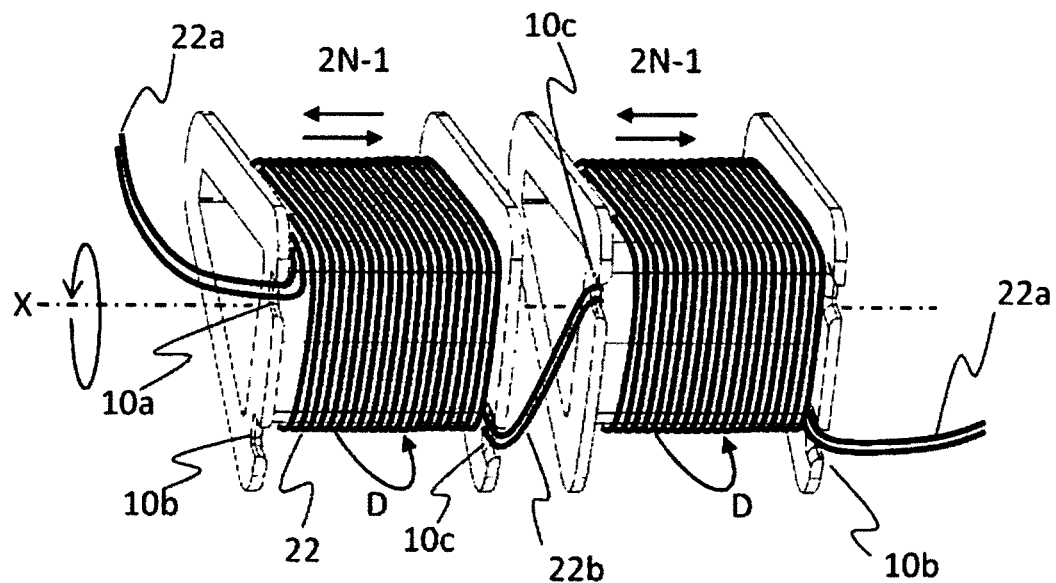
FIG. 5A is a schematic view showing a state of continuous winding of bobbins according to the first embodiment.

Next, the winding method of the coil 22 will be described. FIG. 5 shows an example using the coil 22 having two wires in an odd number of winding stages. The two wires are connected in parallel at end portions. As compared with a coil having one wire, the coil having two wires has an advantage that the wire diameter can be reduced while maintaining the same direct-current resistance. Thereby, the influence of the skin effect of the wire is reduced, and hence, resistance to AC components can be reduced. Although not shown, the bobbin 23 is fixed to a winding jig at the time of winding. At this time, the flanges 23b whose notch shapes are the same are arranged so that the end surfaces of the flanges 23b face each other in the axial direction. That is, the bobbin is rolled in the winding direction in the state where the coil end on the left side in the figure is entwined and fixed to a winding jig, or the like. At the same time, a nozzle which supports the coil is moved in the horizontal direction so that the coil is wound around the tubular section of the coil.

Figure 5B:
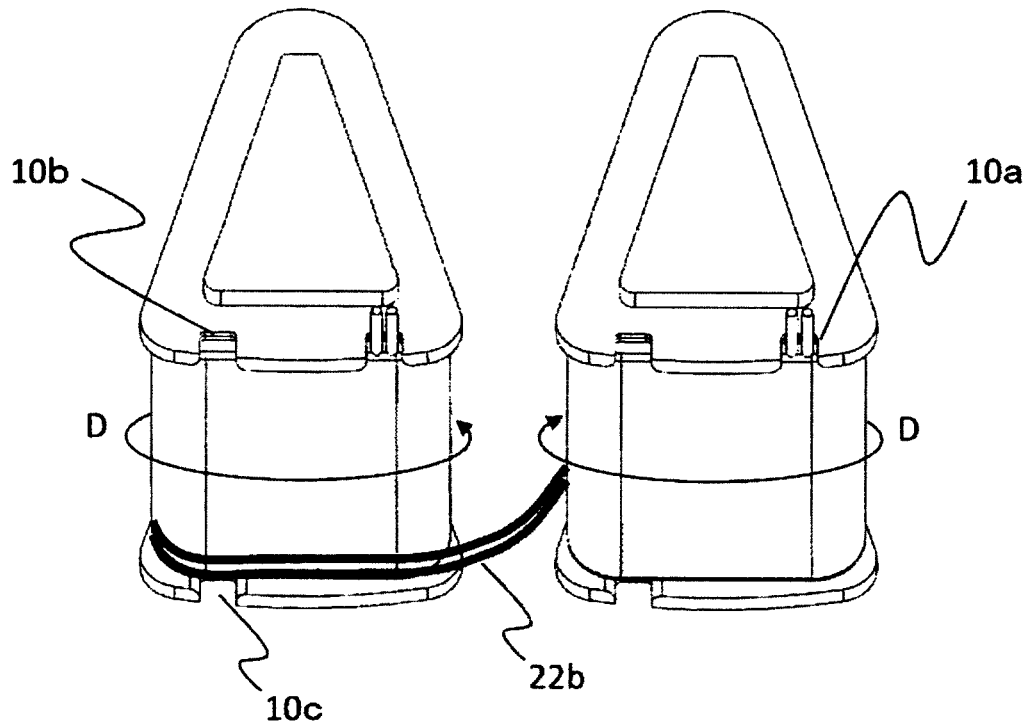
FIG. 5B is a schematic view showing a state of a coil crossover wire portion after coil winding.

In the present embodiment, after the nozzle is reciprocated 2N−1 (N: integer) times between the flanges 23c, the coil 22 is made to pass through the notch 10c, and is then made to pass through the same notch 10c of the bobbin facing the bobbin on which the wire is wound. Thereafter, also for the right side bobbin, the coil 22 is wound by rotating the bobbin 2N−1 (N: integer) times, and then, the coil 22 is led out to the outside through the notch 10b corresponded with the winding start position. As shown in FIG. 5(b), after the winding, a connecting wire 22b between the continuous windings is removed from the notch 10c, and then, the both bobbins are rotated so that the connecting wire 22b passes through the outer diameter side of the winding of the left side bobbin. Thereby, the continuous coils having different winding directions D are completed.

Figure 6A:
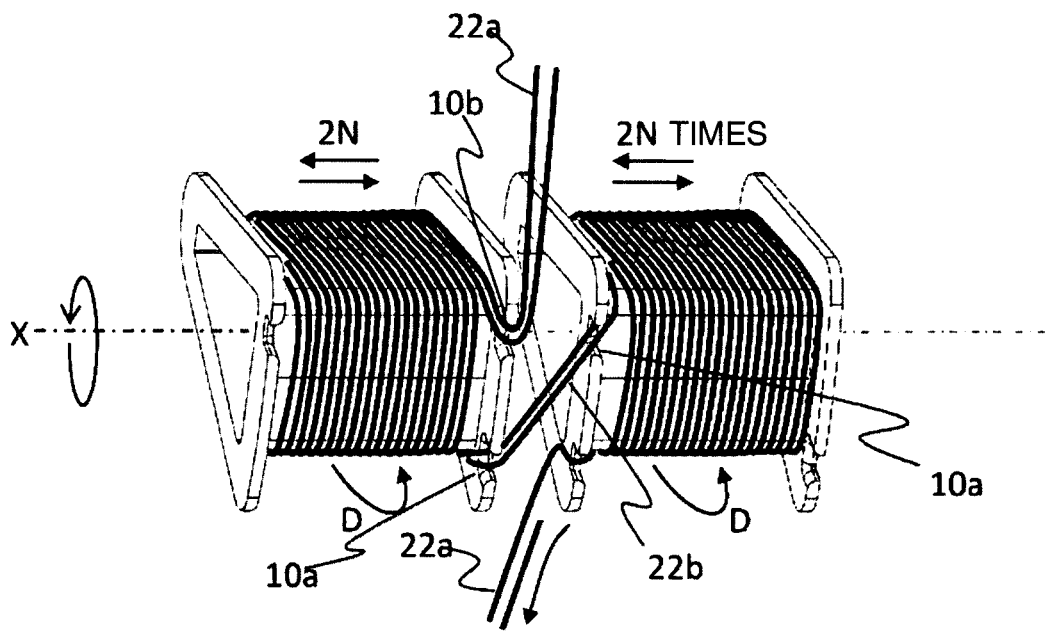
FIG. 6A is a schematic view showing a state of another continuous winding of bobbins according to the first embodiment.
Figure 6B:
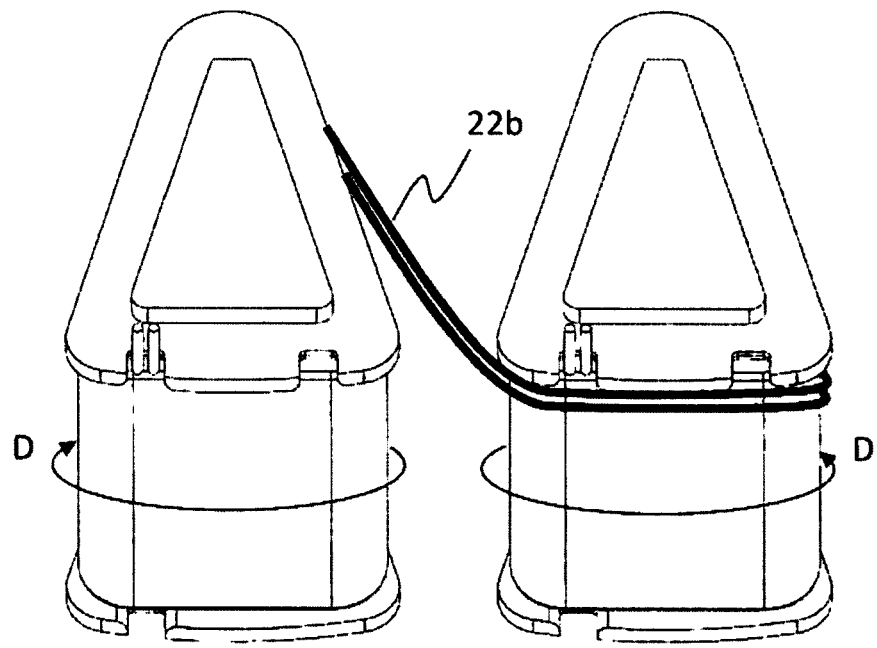
FIG. 6B is a schematic view showing a state of a coil crossover wire portion after coil winding.

Then, FIG. 6(a) and FIG. 6(b) shows an example using the coil 22 having two wires in an even number of winding stages. In this case, the bobbins 23 are arranged so that the flanges 23b each having two notches 10a and 10b face each other. In this state, the winding is started from the notch 10b of the left side bobbin in FIG. 6(a). In the even number of winding stages, the nozzle supporting the coil is located on the winding start side when the last stage of winding is ended. Then, the winding is led out from the other notch 10a to the notch 10a of the adjacent bobbin, and the winding is performed similarly. After the winding, the coil 22 is removed from each of the notches 10b, and then, the bobbin is rotated so that the connecting wire 22b between the continuous windings passes through the outer periphery of the right side coil. Thereby, as shown in FIG. 6(b), the continuous windings having different winding directions D are completed.

According to the first embodiment, the continuous windings having different winding directions can be wound by using the same bobbins. In addition, at the time of an odd number of stages or at the time of an even number of stages, the winding can be performed by using the same bobbins. Further, the horizontal position in the rotation axis direction at each of the winding start and the winding end is the same for the coils 22 adjacent to each other, and the position at which the coil is led out from each of the stator cores 20 can also be the same as the position of each of the notches.

It should be noted that, when the winding directions of the continuous windings are the same, the coil can be wound similarly by changing winding directions of the first and second bobbins.

Further, the winding start and the winding end of the first bobbin are coincident with the winding start and the winding end of the second bobbin, and hence, the difference between the number of windings does not cause a problem. Therefore, electromagnetic imbalance due to the difference between the number of windings does not occur. The connecting wire 22b between the continuous windings can be formed to have a necessary minimum length by appropriately setting the distance between the flanges 23 of the bobbins facing each other. For this reason, there is no possibility that the resistance is increased by the extra connecting wire 22c, and also there is no possibility that the slackened connecting wire 22c becomes too close to the housing 40 and is short-circuited with the housing 40.

Further, each of the notches 10a to 10c is located on the extension line of each of the legs of the tubular section 23a, and hence, when the connecting wire 22b is pulled to the notches 10a to 10c, and the like, it is not necessary to forcibly deform the connecting wire 22c. In this regard, the same effect is obtained in the shape of the connecting wire between the continuous windings, which is obliquely pulled out in the figure.

Further, since the edge of each of the notches 10a to 10c is chamfered into a curvature radius R11, it is suppressed that the coil is bent to have a curvature radius R smaller than the wire diameter, and it is suppressed that the insulating layer of the coil surface is damaged. Preferably, when the curvature radius R is set to about twice the wire diameter, it is possible to more sufficiently obtain the above-described effect. Further, the coil winding machine only needs to have: a one-axis rotating mechanism which rotates at least the bobbin; a nozzle mechanism which moves the coil in the horizontal direction; and a tension mechanism which applies tension to the coil when the coil is moved in the horizontal direction. Therefore, the winding is manufactured with a simple coil winding machine, and hence, the manufacturing cost can be reduced.

Second Embodiment

As one of the features, the motor 1 according to the second embodiment includes a conductive member 50 on the bobbin flange 23c. In the following, the second embodiment is described with reference to the accompanying drawings, but portions that are the same as those in the first embodiment are denoted by the same reference numerals and characters, and the explanation thereof is omitted.

Figure 7:
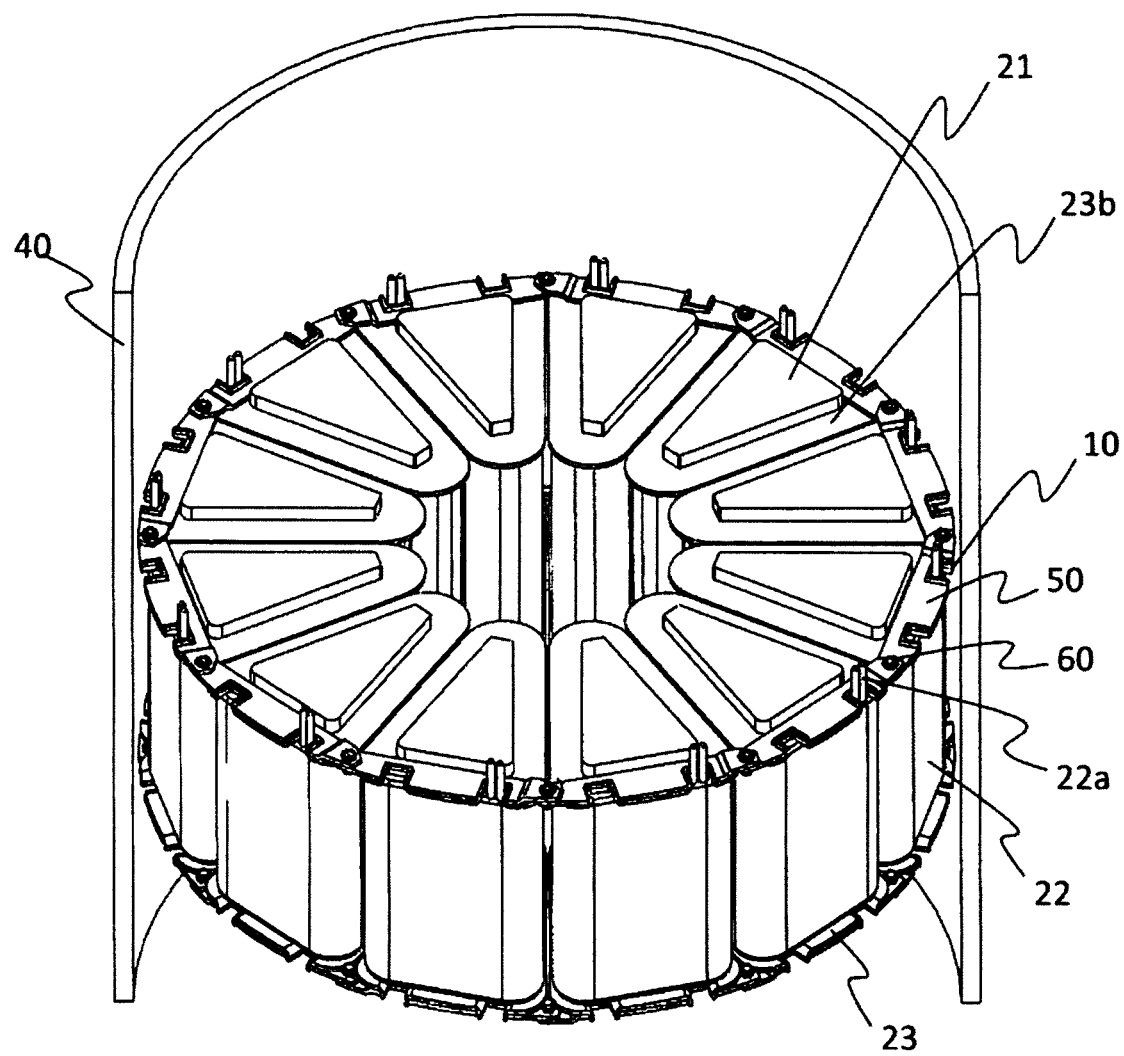
FIG. 7 is a perspective view showing the arrangement relationship of the stator and the housing according to a second embodiment.
Figure 8:
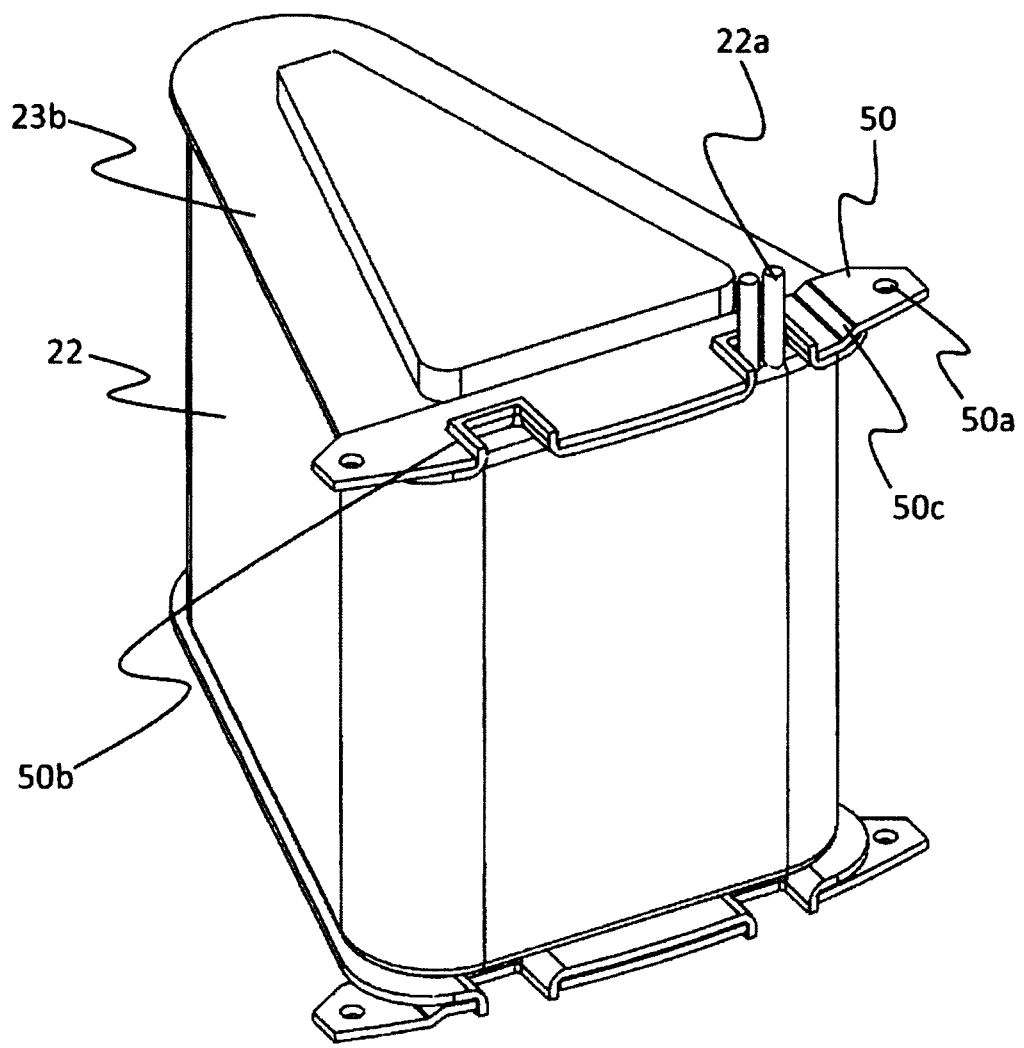
FIG. 8 is a perspective view showing a configuration of a stator core according to the second embodiment.

FIG. 7 shows a state where the stator 19, which is configured by the stator cores 20 each having the conductive member 50 arranged at the flange 23c, is arranged in the housing 40. As shown in FIG. 8, the conductive member is arranged on the flange 23c and on the side of the housing 40, and is formed by a members, such as metal, which has a platy shape. The end portion of the conductive member 50 in the direction of rotation about the rotation axis has a length longer than the housing side length of the flange 23c and protrudes from the flange 23c. An opening 50a is provided in the protruding portion of the conductive member 50. The conductive member 50 is configured such that the opening 50a of one end portion of the conductive member of the stator core 20, and the opening 50a of one end portion of the conductive member of the adjacent stator core 20 can be connected to each other by a fastening members 60, such as a rivet. It should be noted that the conductive members 50 may be in a structural relationship such that a concave portion of the conductive member of the stator core 20, and a convex portion of the conductive member of the adjacent stator core 20 are connected to each other by adhesion, or the like.

Further, as shown in the figures, the conductive member is configured to be in contact with the housing-side outer peripheral surface of the core 21 whose top portion protrudes from the bobbin 23, and is configured such that the end surface of the conductive member, which surface is located on the side opposite to the contact surface, is in contact with the inner peripheral surface of the housing 40. Therefore, the conductive member has a function that the electrostatic capacitance between the rotor 30 and the stator 19 with respect to ground is reduced, and thereby, the shaft voltage around the bearings is reduced to prevent the electrolytic corrosion of the shaft. Further, the conductive member also functions as a plate for cooling the core, and the like.

Further, the conductive member is configured to have notches 50b at (two) portions thereof which respectively face the notches 10a, 10b and 10c of the bobbin 23, and is configured such that the conductive member does not cover the notch 10a, and the like, when being placed on the flange 23c.

Figure 9:
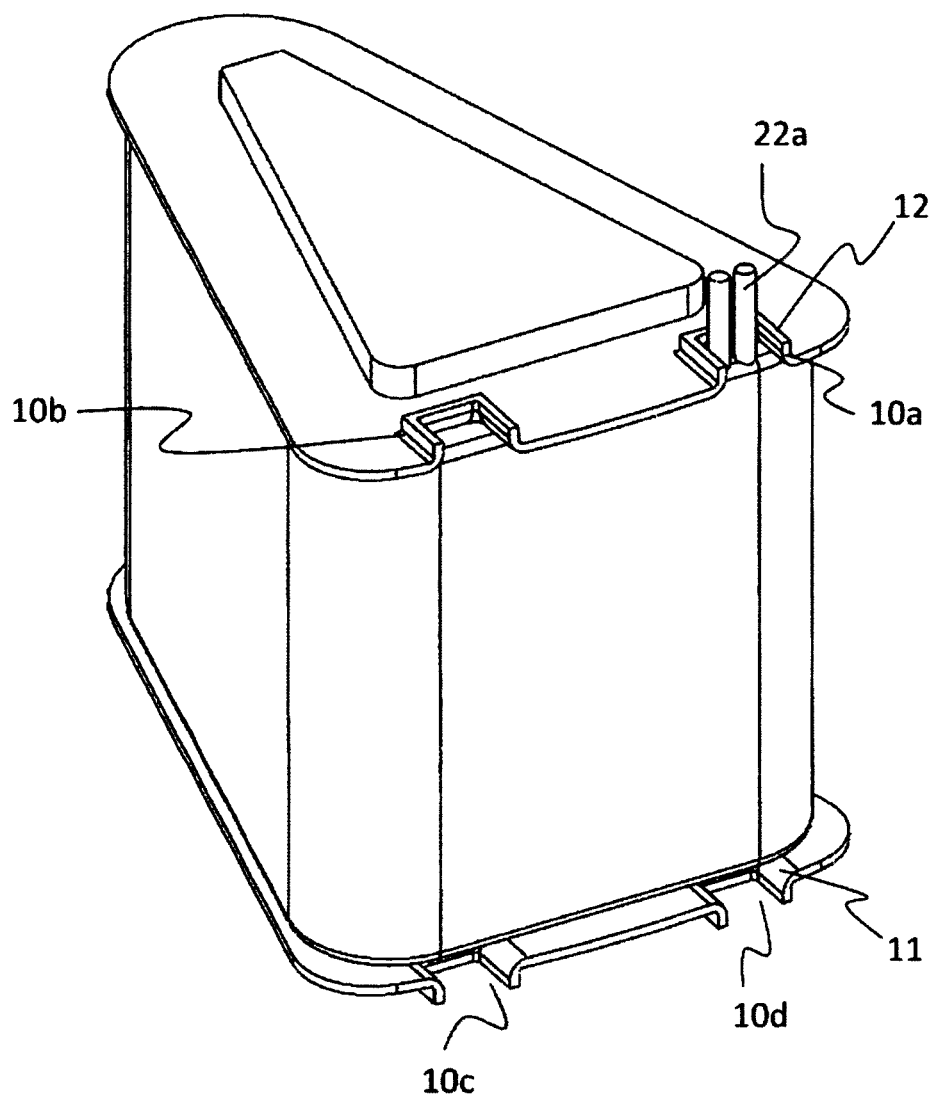
FIG. 9 is a perspective view showing a configuration of the stator core (without conductive member) according to the second embodiment.

FIG. 9 shows a state where the conductive member 50 is removed from the stator core 20 of the second embodiment. In the second embodiment, the inner edge of each of the notches 10a to 10e of the flange 23 of the bobbin has a protruding section 50c extending by a predetermined distance in the axial direction A. The protruding section 50c is formed such that the outer periphery of the protruding section 50c is fitted with the inner edge of the notch 50 of the conductive member.

According to the second embodiment, the conductive member 50 is fitted to the protruding section 12 of the bobbin 23, and the twelve conductive members are fastened to the bobbin 23, to thereby position the bobbin 23. That is, since the bobbin 23 is firmly fixed in the circumferential direction and the radial direction, it is possible that the bobbin 23 is positionally displaced by the injection pressure of the resin when the bobbin 23 is integrally formed by resin molding. Further, the conductive member 50 has thermal conductivity several tens to several thousand times the resin material, and hence also contributes to the cooling.

Further, since the inner edge of the notch 10a, and the like, of the bobbin 23 is protruded in the rotation axis direction, the curvature radius R11 of the corner portion, which is formed between the side surface of the notch 10, and the like, and the bottom surface of the flange 23c, which surface faces the coil, can be increased, and also, the thickness of the flange can be reduced (for example, the thickness of about ½ of the curvature radius R11). When the thickness of the flange 23c is reduced, the axial direction length of the stator core 20 can be reduced. Generally, in the axial-air-gap rotating electric machine, the reduction of the axial direction length of the core reduces the magnetic resistance and loss, and thereby, the motor characteristics are improved. Also, the reduction of the axial direction length of the core reduces the material cost. The protruding section 50b also contributes to securing the creepage distance between the conductive member 50 and the connecting wire 22b.

It should be noted that the second embodiment shows an example in which the protruding section of the inner edge of the notch 10a, and the like, is fitted with the notch of the conductive member 50, but another mechanism having a function of positioning these may also be provided. For example, a tubular protruding section may be provided between the notches 10a, and the like, so that an opening of the conductive member 50, which opening is provided to correspond to the tubular protruding section, is positioned with the tubular protruding section.

Further, the shape of the notch of the bobbin flange 23c may be another shape.

Figure 10:
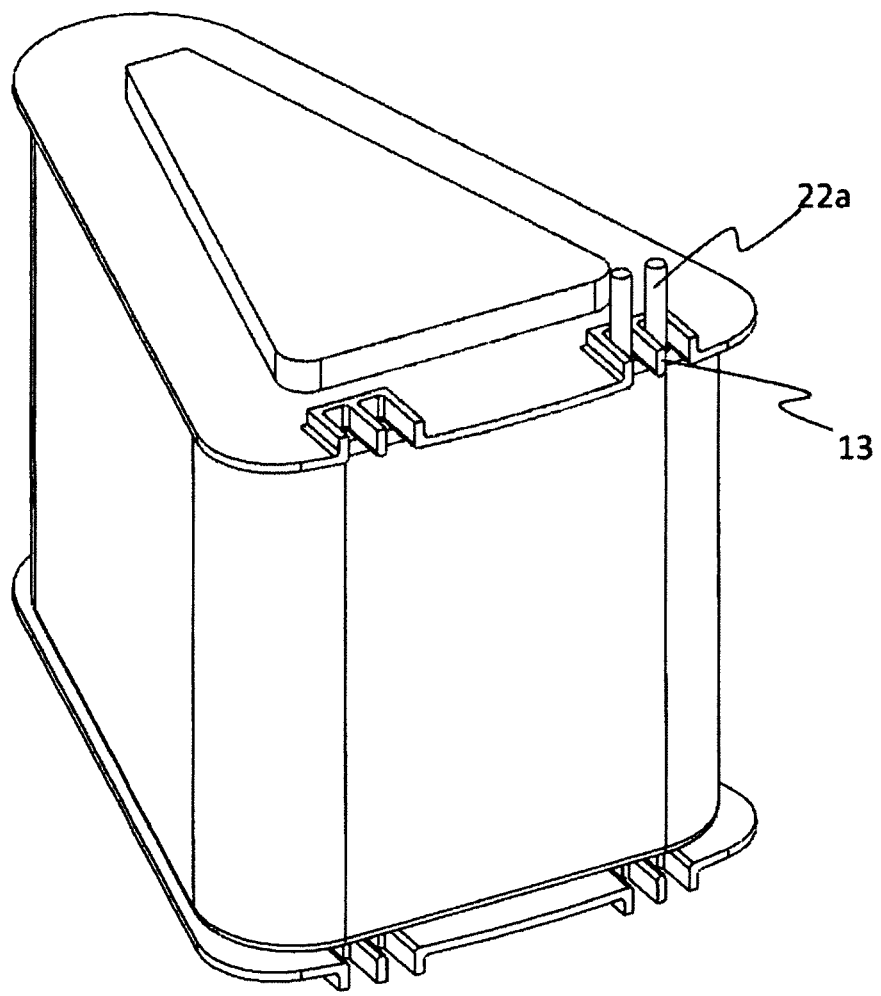
FIG. 10 is a perspective view showing another configuration of the stator core (without conductive member) according to the second embodiment.

FIG. 10 shows a shape in which the notch of the flange 23a is divided into two regions by a partition section 13. When the notch 10a, or the like, is formed to correspond to the number of wires of the coil in this way, the alignment of the coil 22 can be easily secured, so that the workability is improved.

[Manufacturing Method of Bobbin]

The bobbin 23c of the present embodiment is formed by insulating resin and is manufactured by resin molding. However, the present invention is not limited to this, and the bobbin can also be manufactured by a three-dimensional modeling machine, or the like, as described below. That is, the bobbin 23 can be obtained not only by the method in which the bobbin itself is manufactured by the three-dimensional modeling machine, but also by the method in which a metallic mold for resin molding is formed by laminate molding with the three-dimensional modeling machine or by cutting processing with a cutting RP apparatus.

As the laminate molding, it is possible to apply an optical modeling method, a selective laser sintering method, an ink jet method, a resin dissolution lamination method, a gypsum powder method, a sheet forming method, a film transfer image lamination method, a metal optical shaping composite processing method, and the like.

The data for the laminate molding or the cutting processing is generated in such a manner that 3D data generated by CAD, CG software, a 3D scanner, or the like, is processed into NC data by CAM. The data are inputted into the three-dimensional modeling machine or the cutting RP apparatus, and thereby, 3D modeling is performed. It should be noted that NC data may be generated directly from 3D data by CAD/CAM software.

Further, the bobbin 23 and a resin injection molding mold for the bobbin 23 can be manufactured by a method in which a data provider or a servicer, which has created 3D data or NC data, can delivered, via a communication lines, such as the Internet, the 3D data or NC data converted into a predetermined file format, and in which a user downloads the delivered data to a 3D modeling machine, a computer controlling the 3D modeling machine, or the like, or accesses the data as cloud-based services, and thereby, the 3D modeling machine performs the shaping and outputs the result of the shaping to manufacture the bobbin 7. It should be noted that the method, in which the data provider records the 3D data or the NC data in a nonvolatile recording medium to provide the data to the user, can also be used.

An aspect of the manufacturing method of the bobbin 23 according to the present embodiment as described above provides a manufacturing method of a bobbin arranged between a core having an approximately columnar shape having end surfaces and an outer peripheral surface, and a coil wound around the outer peripheral surface of the core. The manufacturing method is characterized in that the bobbin is manufactured by the 3D modeling machine on the basis of the three dimensional data, the bobbin including: an inner tubular portion having an inner peripheral shape approximately coincident with the outer peripheral shape of the core; an outer tubular portion around which the coil is wound; and a flange which is extended, by a predetermined length, from the vicinity of each of both openings of the outer tubular portion in the direction perpendicular to the tubular portion, and which includes two first notches provided on one side of the flange, and at least a second notch provided on the other side of the flange and facing one of the first notches.

Further, another aspect of the manufacturing method of the bobbin 23 as described above provides a manufacturing method of a bobbin arranged between a core having an approximately columnar shape having an end surface and an outer peripheral surface, and a coil wound around the outer peripheral surface. The manufacturing method is characterized in that data for the three-dimensional modeling machine for manufacturing the bobbin are transmitted and delivered via a communication line, the bobbin including: an inner tubular portion having an inner peripheral shape approximately coincident with the outer peripheral shape of the core; an outer tubular portion around which the coil is wound; and a flange which is extended, by a predetermined length, from the vicinity of each of both openings of the outer tubular portion in the direction perpendicular to the tubular portion, and which includes two first notches provided on one side of the flange, and at least a second notch provided on the other side of the flange and facing one of the first notches.

In the above, the embodiments for carrying out the present invention are described, but the present invention is not limited to these. For example, each of the above-described embodiments is configured such that the flange 23b has the notches at two places on the same surface, and the winding is lead out from one of the notches. Thereby, the notch, at which the connecting wire 22b is not provided, is formed at one place of each of the upper and lower flanges 23b. Thereby, a path, through which resin is moved in the axial direction at the time of resin molding, can be formed. A resin injection port can be provided at this position.

Further, in the embodiments, the double-rotor type axial-air-gap motor is used as an example, but a synchronous reluctance motor, a switched reluctance motor, an induction motor, or the like, in each of which no permanent magnet is provided, may also be used. Further, other the motor, a generator may also be used. Further, in the rotor, a back yoke may be provided between the permanent magnet and the yoke.

Figure 11A:
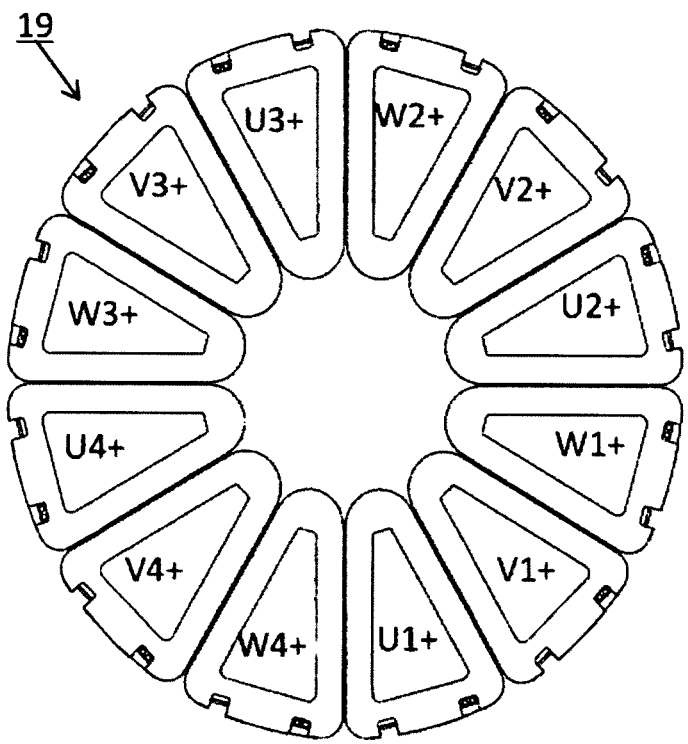
FIG. 11A is a sectional view of a stator of an 8-pole 12-slot motor as another embodiment of the present embodiment.
Figure 11B:
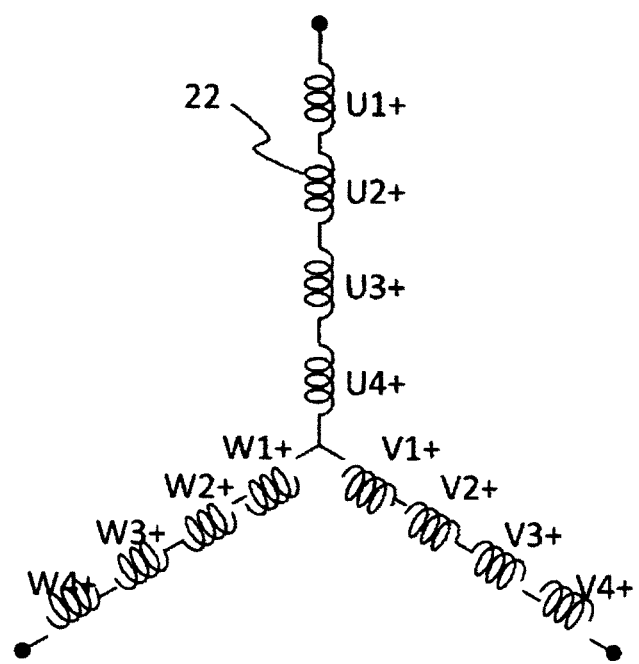
FIG. 11B is a schematic view showing the wiring relationship of the 8-pole 12-slot motor.

The winding specifications are not limited to those described above. FIGS. 11(a) and 11(b) show a connection diagram assuming an 8-pole 12-slot motor. Here, an example is shown in which three windings, each formed by connecting four coils in series, are star-connected. In this case, the winding directions of all the coils are the same. Therefore, the four continuous coils can be manufactured in such a manner that four bobbins are arranges in series in the axial direction, and that the winding direction of the coil is alternately reversed. The number of wires of the coil can be arbitrarily set.

The shape of the notch is also not limited to the present embodiments. As described above, it is only necessary that at least three notches be provided, and three or more notches may also be provided. Further, in the present embodiments, the shape of the notch is the rectangular shape parallel to the lower base of the trapezoidal shaped core, but the shape of the notch may also be a rectangular shape, a trapezoidal shape, a semicircular state, or the like, which are parallel to the radial direction.

REFERENCE SIGNS LIST

1 Double-rotor type axial-air-gap permanent magnet synchronous motor
10a, 10b, 10c, and 10d Notch
11 Curvature radius R
19 Stator
20 Stator core
21 Core
22 Coil
22a Lead-out section
22b Connecting wire
23 Bobbin
23a Cylindrical section
23b Flange
30 Rotor
31 Permanent magnet
32 Yoke
40 Housing
50 Conductive member
50a Opening
50b Notch
50c Step portion
60 Fastening member
D Winding direction

The invention claimed is:
1. An axial-air-gap rotating electric machine including:
a stator configured in such a manner that a plurality of stator cores each having a core having a columnar shape having an end surface and an outer peripheral surface, a coil wound around the outer peripheral surface of the core, and a bobbin arranged between the core and the coil, are arranged annularly about the rotation axis of the machine; and at least one rotor, a surface of which faces the end surface via a predetermined air gap on each of the rotation axis radial directions,
wherein the bobbin is formed in a tubular shape having an inner peripheral shape coincident with the outer peripheral shape of the core, and has flanges extended by a predetermined length from the vicinity of each of both openings of the bobbin to the outer peripheral side,
one of the flanges has two first notches,
the other of the flanges has at least one second notch, and
the axial direction position of the winding start of the coil of the stator core is equal to the axial direction position of the winding end of the coil of the adjacent stator core, and the flange having the notch through which the coil of the stator core is led out, and the flange having the notch through which the coil of the adjacent stator core is led out are located on the same opening side, and
wherein the core has a columnar shape having end surfaces whose width in the rotation axis direction is increased toward the direction away from the rotation axis, and
one of the first notches and one of the second notches are arranged respectively at the positions in the rotation axis direction, and are arranged respectively at the positions on the flange extended in the radial direction from the portion at which the width of the core in the rotation direction is largest.

2. The axial-air-gap rotating electric machine according to claim 1, wherein
the two first notches are arranged respectively at positions that are symmetrical with respect to a symmetry line which is an imaginary line radially extending from the rotation axis of the machine.

3. The axial-air-gap rotating electric machine according to claim 1, wherein
the coils are aligned with the winding in an odd number of stages.

4. The axial-air-gap rotating electric machine according to claim 1, wherein
the coils are aligned with the winding in an even number of stages in a rotation axis direction.

5. The axial-air-gap rotating electric machine according to claim 1, wherein
the core has a columnar shape whose end surfaces each have a trapezoidal shape, and
one of the first notches and one of the second notches are arranged respectively at the positions in the rotation axis direction, and also, the surface of the two first and second notches, which is projected to the core, is consistent with one of the lower bottom ends of the core.

6. The axial-air-gap rotating electric machine according to claim 1, wherein
the inner edge of each of the first and second notches is chamfered.

7. The axial-air-gap rotating electric machine according to claim 6, wherein
the chamfering has a curvature radius R which is more than the diameter of the coil and is not more than twice of the diameter of the coil.

8. The axial-air-gap rotating electric machine according to claim 1, wherein
each of the inner edge of each of the first and second notches has a protruding section protruding in the direction opposite to the direction in which the flanges face each other.

9. The axial-air-gap rotating electric machine according to claim 1, wherein
the corner of the inner edge of each of the first and second notches, which inner edge is located on the side facing the other flange, has a curvature radius R which is more than the diameter of the coil and is not more than twice of the diameter of the coil, and the inner edge corner opposite to the inner edge corner having the curvature radius R has a protruding section protruded in the opposite direction, and
the thickness of the first and second notches is not larger than ½ of the curvature radius R.

10. The axial-air-gap rotating electric machine according to claim 1, wherein
each of the first and second notches is divided into a plural number of regions which correspond to the number of wires forming the coil.

11. An axial-air-gap rotating electric machine including:
a stator configured in such a manner that a plurality of stator cores each having a core having a columnar shape having an end surface and an outer peripheral surface, a coil wound around the outer peripheral surface of the core, and a bobbin arranged between the core and the coil, are arranged annularly about the rotation axis of the machine; and at least one rotor, a surface of which faces the end surface via a predetermined air gap on each of the rotation axis radial directions,
wherein the bobbin is formed in a tubular shape having an inner peripheral shape coincident with the outer peripheral shape of the core, and has flanges extended by a predetermined length from the vicinity of each of both openings of the bobbin to the outer peripheral side,
one of the flanges has two first notches,
the other of the flanges has at least one second notch, and
the axial direction position of the winding start of the coil of the stator core is equal to the axial direction position of the winding end of the coil of the adjacent stator core, and the flange having the notch through which the coil of the stator core is led out, and the flange having the notch through which the coil of the adjacent stator core is led out are located on the same opening side, and
wherein the core has a columnar shape whose end surfaces each have a trapezoidal shape, and
one of the first notches and one of the second notches are arranged respectively at the positions in the rotation axis direction, and also, the surface of the two first and second notches, which is projected to the core, is consistent with one of the lower bottom ends of the core.

12. The axial-air-gap rotating electric machine according to claim 11, wherein
the two first notches are arranged respectively at positions that are symmetrical with respect to a symmetry line which is an imaginary line radially extending from the rotation axis of the machine.

13. The axial-air-gap rotating electric machine according to claim 11, wherein
the coils are aligned with the winding in an odd number of stages.

14. The axial-air-gap rotating electric machine according to claim 11, wherein
the coils are aligned with the winding in an even number of stages in a rotation axis direction.

15. The axial-air-gap rotating electric machine according to claim 11, wherein
the core has a columnar shape having end surfaces whose width in the rotation axis direction is increased toward the direction away from the rotation axis, and
one of the first notches and one of the second notches are arranged respectively at the positions in the rotation axis direction, and are arranged respectively at the positions on the flange extended in the radial direction from the portion at which the width of the core in the rotation direction is largest.

16. The axial-air-gap rotating electric machine according to claim 11, wherein
the inner edge of each of the first and second notches is chamfered.

17. The axial-air-gap rotating electric machine according to claim 16, wherein
the chamfering has a curvature radius R which is more than the diameter of the coil and is not more than twice of the diameter of the coil.

18. The axial-air-gap rotating electric machine according to claim 11, wherein
each of the inner edge of each of the first and second notches has a protruding section protruding in the direction opposite to the direction in which the flanges face each other.

19. The axial-air-gap rotating electric machine according to claim 11, wherein
the corner of the inner edge of each of the first and second notches, which inner edge is located on the side facing the other flange, has a curvature radius R which is more than the diameter of the coil and is not more than twice of the diameter of the coil, and the inner edge corner opposite to the inner edge corner having the curvature radius R has a protruding section protruded in the opposite direction, and the thickness of the first and second notches is not larger than ½ of the curvature radius R.

20. The axial-air-gap rotating electric machine according to claim 11, wherein each of the first and second notches is divided into a plural number of regions which correspond to the number of wires forming the coil.

\* \* \* \* \*